(12) United States Patent
Hansen

(10) Patent No.: US 9,259,800 B2
(45) Date of Patent: Feb. 16, 2016

(54) METHOD FOR PRODUCING A STRUCTURE AND PRODUCT PRODUCED BY THE METHOD

(71) Applicant: Bernd Hansen, Sulzbach-Laufen (DE)

(72) Inventor: Bernd Hansen, Sulzbach-Laufen (DE)

( * ) Notice: Subject to any disclaimer, the term of this patent is extended or adjusted under 35 U.S.C. 154(b) by 100 days.

(21) Appl. No.: 13/261,826

(22) PCT Filed: Sep. 26, 2012

(86) PCT No.: PCT/EP2012/004018
§ 371 (c)(1),
(2) Date: Mar. 6, 2014

(87) PCT Pub. No.: WO2013/045077
PCT Pub. Date: Apr. 4, 2013

(65) Prior Publication Data
US 2014/0305831 A1    Oct. 16, 2014

(30) Foreign Application Priority Data

Sep. 27, 2011   (DE) .......................... 10 2011 115 256

(51) Int. Cl.
*B23K 26/00*   (2014.01)
*B41M 5/26*   (2006.01)
*B41M 5/24*   (2006.01)

(52) U.S. Cl.
CPC ......... *B23K 26/0066* (2013.01); *B23K 26/0006* (2013.01); *B23K 26/0087* (2013.01); *B41M 5/267* (2013.01); *B23K 2201/12* (2013.01); *B23K 2203/42* (2015.10); *B41M 5/24* (2013.01)

(58) Field of Classification Search
None
See application file for complete search history.

(56) References Cited

U.S. PATENT DOCUMENTS

| 3,627,858 | A | 12/1971 | Parts et al. |
| 3,909,582 | A | 9/1975 | Bowen |
| 6,427,420 | B1 | 8/2002 | Olivieri et al. |

FOREIGN PATENT DOCUMENTS

| DE | 196 45 871 A1 | 5/1998 |
| EP | 0 475 861 A1 | 3/1992 |
| WO | WO 2004/096659 A2 | 11/2004 |

*Primary Examiner* — Monica Huson
(74) *Attorney, Agent, or Firm* — Wenderoth, Lind & Ponack, L.L.P.

(57) ABSTRACT

A method for producing at least one structure (13) by laser action on at least one wall part (11) of a container wall (29) of a product, preferably a plastics container product (1) produced by a blow-molding, filling and sealing method. The particular structure (13) is introduced by the laser action, at least with the laser power, the period of action of the laser, the type of plastics material and the type of desired structure being taken into account, as a linear depression (17) in the one wall part (11). The depression (17) is delimited at the edge and in a manner following the profile of the linear depression (17) by in each case one elevation (27) brought about under the influence of the intrinsic material stress of the plastics material.

11 Claims, 3 Drawing Sheets

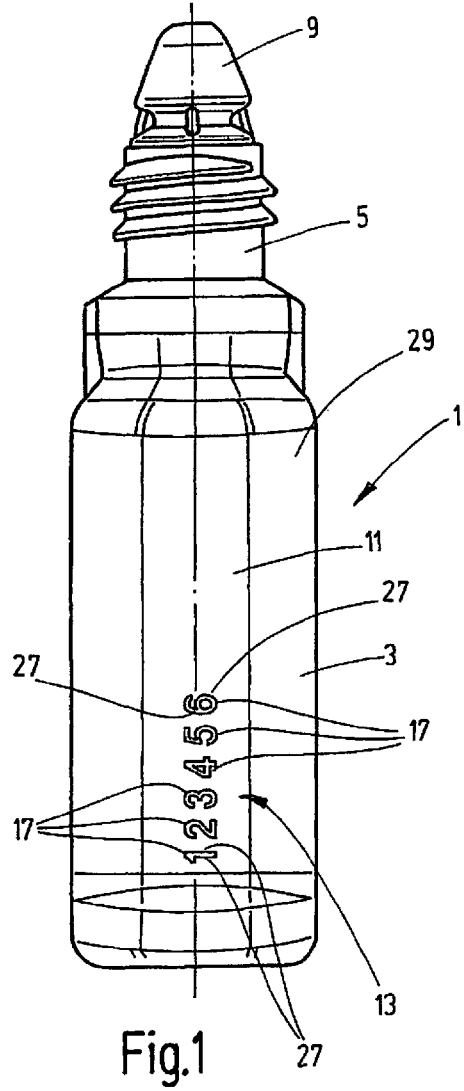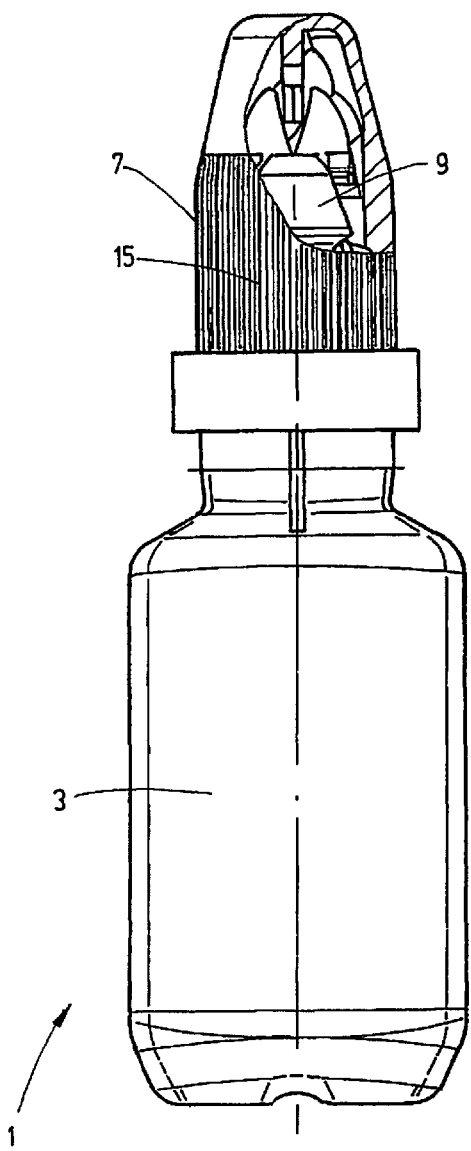

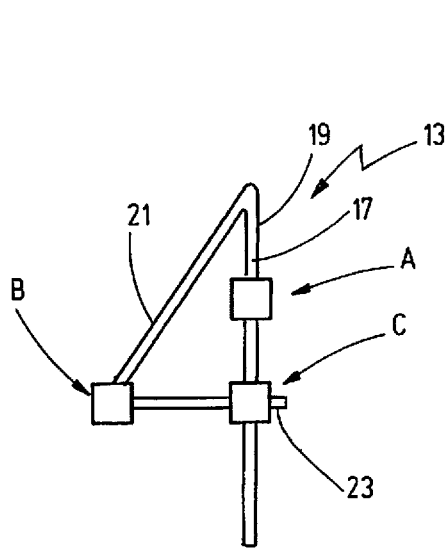
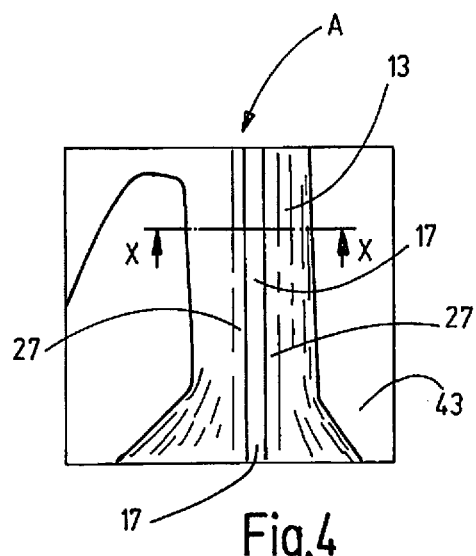
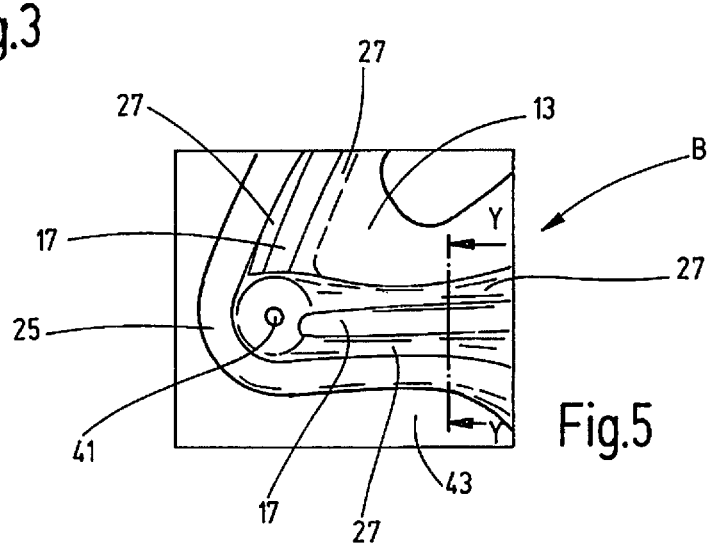
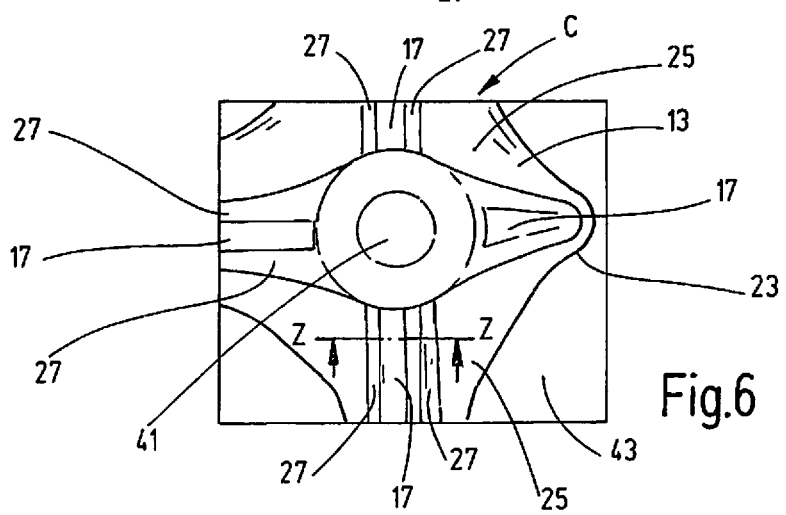

METHOD FOR PRODUCING A STRUCTURE AND PRODUCT PRODUCED BY THE METHOD

FIELD OF THE INVENTION

The invention relates to a method for producing at least one structure by laser action on at least one wall element of a container wall of a plastic container product that is preferably produced by means of a blow-molding, filling and sealing process. The invention further relates to a product produced by the method, in particular in the form of a container of this kind.

BACKGROUND OF THE INVENTION

Apparatuses and methods for the production of hollow containers made out of plastic, such as ampules, are prior art in a plurality of embodiments and are widely used in packaging systems for liquid or paste-like products, for example in conjunction with the known Bottelpack® system. A comparable blow-molding, filling and sealing process for producing receptacles, such as containers or ampules, is disclosed, for example, in EP 0 359 971 B1.

The prior art also includes container products produced in this manner with an external structure. In this respect, DE 103 28 198 A1 discloses an embossing method, in which a corresponding structure is produced through embossing on the container product or on a separable component thereof. The embossed structure, which is thereby produced by a depression, forms an identifying marker representing the characteristic data of the plastic container. In particular, this data may take the form of code numbers, which may provide information about the location and date of production, as well as the type and quantity of the respective contents of the container, among other things, including any expiration dates for the contents of the container.

This characteristic data may also be provided in an unencrypted format in order to inform the end user base. To that end, the characteristic data takes the form of alphanumeric characters or letters. Characteristic data of this kind is preferably applied directly to the container product in areas that include the interior of the container product with the fluid or other medium thereof. In this case, the embossing processes should be undertaken with care to avoid puncturing the container product during the embossing process, which puncturing could lead to the contents of the container becoming unusable.

U.S. Pat. No. 3,627,858 A describes a method for producing a foam-like surface region on a thermoplastic wall of a plastic article from the group of polystyrenes, polyamides and the like. The plastic component is first steeped in a medium and subsequently locally heated by a $CO_2$ laser having a wavelength of 10.6 μm to form a foam-like region on the plastic component that can form a structurally introduced identifying marker.

DE 196 45 871 A1 describes a method for the production of molds. At least two differently colored plastic granules are mechanically mixed, for example by a hot pressing method or injection molding with two more components. A laser inscription is subsequently applied by "vaporizing" the plastic material in the region of the lettering.

The known methods for introducing a structure in a plastic component still leave something to be desired with regard to the shortness of the duration of the method, as well as the precision and the recognizable clarity of the structure that is to be produced.

SUMMARY OF THE INVENTION

An object of the invention is to provide an improved method for producing appropriate structures in plastic container products of this kind that can be performed in a particularly simple and reliable manner, and that results in clearly formed, recognizable structures. A further object of the invention is to produce a product having the appropriate structures, which structures preferably can be produced by the method according to the invention.

These objects are basically achieved by a method, as well as a product, having the respective structure to be produced to be introduced as a linear depression in a wall element of a plastic wall by laser action, taking into account at least the
 laser power,
 exposure time of the laser,
 type of plastic material and
 type of structure that is desired,
In that way, this depression is bordered by a projection along the edge following the linear depression. The projection is produced at least in part under the influence of the inherent material tension of the plastic material.

Therefore, a depression having a wave-shape when viewed in cross section is formed in the container wall, which wall is bordered on both sides by projections that extend linearly with respect to the remaining container wall. A displacement of the material occurs while forming the depression in the direction of the linear projection formed thereby. The container wall made out of a plastic material is heated locally by the laser action, and without cutting through plastic fibers or molecular chains of this kind in the region of the linear depression. Without the plastic material being essentially vaporized in the region of the depression by the laser action, the heated plastic material is displaced outward at the edges under the action of the laser. When viewed in cross-section, a kind of wave forms, having a central wave trough and wave crests adjoining on the edges. The displacement of the plastic materials in the direction of the linear projections or wave crests is effected under the influence of the inherent material tension of the plastic material heated to this extent. Capillary and/or surface tension effects may likewise play a role.

For the average person skilled in the art in the field of utilizing laser technology with plastic materials, it is surprising that, without having to foam up plastic material with a laser as shown in the prior art (U.S. Pat. No. 3,627,858 A), and without needing to essentially vaporize the plastic material (DE 196 45 871 A1), structures can be produced that, when viewed in terms of the linear projections, consistently protrude with respect to the remaining wall elements of the container wall, and vastly improved results are achieved in terms of producing the structure, which in this respect, also protrudes from the respective container, are clearly visible and can clearly be felt.

Since the product with which the container is to be filled may be a sensitive liquid medication, which medication may need to be filled under sterile clean-room conditions and may react sensitively to atmospheric oxygen, in particular in terms of the lifespan thereof, the method according to the invention ensures that the plastic material is not damaged by the laser action. In particular, plastic material vaporized or converted into the form of bubbles and the underlying structure, such as the fibers or molecular chains of the plastic material, are also not affected. Despite the production of the structure, the container wall is then not weakened or modified such that an increased quantity of unwanted atmospheric oxygen or other media that could damage the inside of the container cannot unintentionally penetrate the plastic container wall. To reliably protect the contents of the container, the respective linear depression should not reduce the thickness of the container wall by more than 50%.

In the case of the method described above, a structure is produced in the container wall that is clearly externally visible. Depending on the layout of lines, it is suitable for the formation of letters, numbers, points and also for obtaining Braille lettering. Furthermore, the respective structure can be used as ribbing on the container wall or a cap, for example, to improve the surface feel. Thus, a simple, reliably functioning and flexible method for producing structures for plastic products of any kind is depicted, preferably however for container products.

Particularly advantageously, both the structure produced in the one respective element, as well as at least the directly adjacent wall elements are formed as a container wall, which wall is closed off to the outside environment, extends continuously and is formed such that it is intrinsically homogeneous and bubble-free. In this way, no later inclusion of foreign matter can occur in the container wall. The diffusion of particles from the environment through the container wall is reduced to a minimum so that the contents of the container, which may already be in the container when the structure is produced, will not become unusable either during the production of the structure, or during subsequent storage.

Advantageously, during the laser action, the respective wall element of the container wall is still heated from the preceding molding process, in particular blow molding processes. This heating allows for a fast process sequence, and the advantageous utilization of the heated, and therefore softer, structure of the container wall in producing the desired wave form.

The linear depressions can be merged at connection points such as joints or intersection points, which are externally bordered by the projection along the edge up to the cross-over point of the respective depression.

Especially advantageously the laser intensity for producing the structure is reduced when the marking speed is reduced or wall elements are irradiated for a second time. This measure ensures that the respective linear depression is formed having an approximately uniform depth and in any case, prevents the container wall from being burned through.

In the region of joints and/or intersection points, at least two linear depressions can be advantageously disposed, at least in part, parallel to one another. The depressions border a further projection therebetween, which further projection is disposed on the same level or on a level that differs from that of the levels of the other projections. This measure allows the joints and/or intersection points to be easily formed and raised so that they are easily visible. In particular, the laser beam does not need to precisely hit the already produced depression of the wave structure that has already been applied.

Especially advantageously an additional structure is introduced in the wall element of the container wall opposite the wall element of the container wall having the structure and facing the inside of the container, which additional structure follows the one structure in such that a projection is applied or introduced respectively at the location. This feature represents a supportive reinforcement and a standardization of the container wall in the sense of the desired homogenization.

The respective structure is advantageously produced by a $CO_2$ laser. Within the context of the solution according to the invention, lasers of this kind are especially suited for producing structures in plastic products due to the frequency spectrum and intensity thereof.

Especially advantageously, the respective structure can be introduced by means of laser action in plastic container products made out of a polyolefin plastic material. In particular, the structure production described can also be used for co-extruded wall elements of receptacles, wherein at least two layer or laminated wall elements come to lie against one another. Accordingly, an external wall layer of the co-extruded plastic product can be selected on the material side such that the structure can be introduced in the relevant wall element in an especially inexpensive and procedurally reliable manner. At least one subsequent, co-extruded layer in the composite preferably comprises another plastic material in the manner of a barrier that is able to prevent the migration of foreign material into the inside of the receptacle. To produce a structure having a good surface feel and/or legibility, it can be sufficient if, at the linear depression in the wall element of the container, the linear projection parallel to the linear depression only occurs on one wall side, which then, however, requires a very precise laser application technology.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings that form a part of this disclosure:

FIG. 1 is a side view of an ampule-like plastic container provided with an outer structure in the form of an inscription according to a method according to an exemplary embodiment of the invention, without the associated cap element;

FIG. 2 is a side view of the container rotated 90° with respect to FIG. 1 having a partially cut away cap element;

FIG. 3 is a side view of a structure produced, using the number "4" as an example, according to the number sequence in FIG. 1;

FIG. 4 is a side view in the manner of a photographic representation of the structure in FIG. 3 at position A;

FIG. 5 is a side view in the manner of a photographic representation of the structure in FIG. 3 at position B;

FIG. 6 is a side view in the manner of a photographic representation of the structure in FIG. 3 at position C;

DETAILED DESCRIPTION OF THE INVENTION

Figure 7:
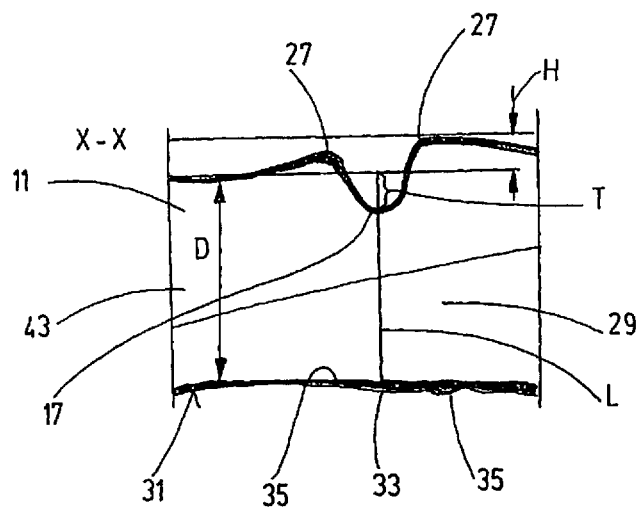
FIG. 7 is a partial end view in section of the structure in FIG. 3 at position A taken along the line X-X in FIG. 4.

A plastic container product or receptacle in the form of a ampule 1 is shown. The ampule 1 has a container body 3, on top of which a neck element 5 is connected, with cap element 7 screwed on the neck element 5, as shown in FIG. 2. The neck element 5, the cap element 7, as well as a closure element 9 located at the end of the neck element 5, are formed in the manner known from DE 10 2005 025 760 A1. FIG. 2 shows the cap element 7 in an initial position corresponding to an ampule 1 in its condition on delivery. As is known from the aforementioned document, the cap element 7 forms an opening device when it is further unscrewed to release the contents of the ampule for use when the closure element 9 is penetrated by a spike in the cap element 7.

The drawing shows, as an example of a container product, the provision of an external structure using the method according to the invention on an ampule 1 with a capacity of 10 ml in a scale that is double the natural size. The ampule 1 has a container body 3 having a not perfectly round, essentially oval form. In FIG. 1 the narrower side of the container body 3 is visible. An external structure in the form of an identifying marker 13 is applied to a central wall element 11 of this narrower side, which structure in the present example comprises a six-digit code, 1 2 3 4 5 6. These digits are formed by laser action. The laser device (not shown) is preferably disposed as a stand-alone laser station between the Bottelpack® production equipment and a punching device, which punching device separates trim edge waste at the ampule binding piece and/or separates the ampules. The laser station can be synchronized in coordination with the Bottelpack® system. In the case of a laser station that is working in a close temporal and spatial relationship with the Bottelpack® system, the plastic of the ampule 1 may still have an elevated temperature as a result of process-related residual heat, preferably in the range of 45° C., which temperature is beneficial for producing the structure in the container wall 29.

While FIG. 1 shows an identifying marker 13 as a structure produced in a wall element 11 of a container within the meaning of a readable code inscription 1 2 3 4 5 6, other structures can be formed in the container by the laser action described in greater detail below, for example to improve the surface feel of the container product. Thus, for example, FIG. 2 shows a ribbing 15 created on the cap element 7 of the ampule 1, which ribbing improves the handling of the cap element 7.

The introduction of the structure 13 is described in greater detail below on the basis of FIGS. 3 to 9. As can be seen in FIG. 3, the number "4" of the code 1 2 3 4 5 6 according to FIG. 1 is to be introduced as a structure by laser action as a linear depression 17 in a wall element 11 of the container wall 29 of a plastic container product, taking into account at least the laser power, exposure time of the laser and type of plastic material. In so doing, this depression should be flanked by projections 27 along the edge following the depression 17, which projections are produced under the influence of the material tension of the plastic material. In this particular example, the vertical line 19 of the number "4" is initially produced, which vertical line opens seamlessly into a sloped line 21 as well as in a horizontal line 23 crossing the vertical line 19. The structure of the linear depression 17, with its two projections 27 and adjoining edge regions 25 at positions A, B and C, is shown in FIGS. 4 to 6 each in a side view in the manner of a photographic representation. The linear projections 27 meet at positions B and C, provided the laser produces the structure 17 in a single process step.

A linear depression 17 is formed at position A of the vertical bar of the "4". This depression takes a straight course. The depression 17 is essentially U-shaped and is reminiscent of a wave trough. The depression is bordered at the edges by projections 27, which projections can be described as wave crests. These wave crests 27 are elevated with respect to the remaining container wall 29 (see FIG. 7). The maximum depth T of the linear depression 17 is approximately ⅙ of the thickness D of the remaining container wall 29 in this region. The projections 27 have a maximum height H of approximately 1/12 of the thickness D of the container wall 29.

In the image plane of FIG. 7 viewed from left to right, the course of the outer contour of the container wall 29 having the wall element 11 rises slightly, until the highest point of the left projection 27 is reached as a first wave crest, then flows into the U-course of the linear depression 17 as a wave trough and transitions, in a largely symmetrical form, into the right projection 27 on the opposite side as an additional, second wave crest, which, starting from the maximum possible height H, then flattens out again. On the opposing inner side 31, the container wall 29 is thickened in the region of the linear depression 17 to form a shallow rib 33. The rib 33 is flanked by depressions 35 on either side. Thus, an additional structure 33, 35 is introduced in the wall element 31 that lies opposite the wall element 11 having the structure 13, and that faces the inside of the container. The additional structure follows the one structure 13 such that a projection 33 is introduced at the location of a corresponding depression 17. Also, a depression 35 is introduced at the location of the respective projection 27. Nevertheless, the cross-sectional view in FIG. 7 clearly shows that the projection 33 as well as the respective externally adjacent depressions 35 have less form than the wave on the external side of the container wall 29 facing outward towards the environment. To clarify the geometric situation of the opposing arrangement, in addition to a notional horizontal line, a notional vertical axis L is shown in FIG. 7, which line marks the average depth T of the depression 17 in the upper region.

Figure 8:
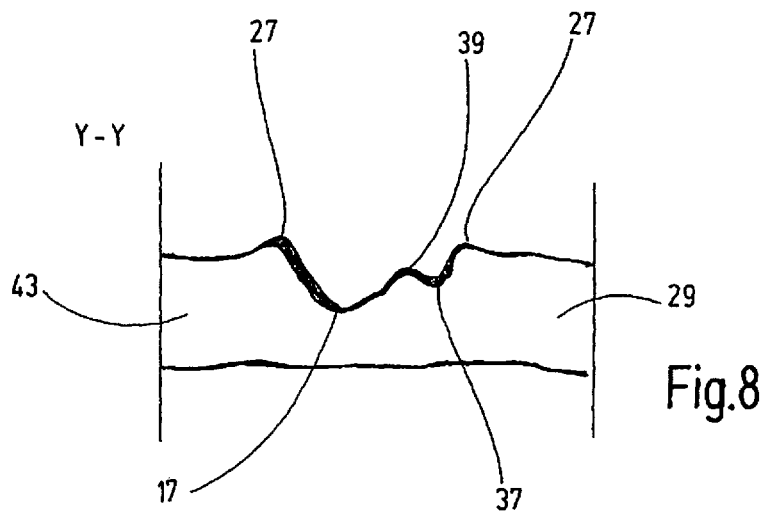
FIG. 8 is a partial end view in section of the structure in FIG. 3 at position B taken along the line Y-Y in FIG. 5.

In corner regions (position B) or intersection regions (position C), the rate or progression of the laser must be increased accordingly, or the laser intensity must be reduced to prevent the container wall 29 from being burned through. The line-shaped depressions 17 also do not meet in these regions, so that linear depressions 17 may regularly be disposed parallel to one another, which the cross-sectional views in FIGS. 8 and 9 show in particular.

The structure produced in the corner region (Position B) of the number "4" (see also FIG. 8), thus has two depressions 17, 37 of different depths that extend parallel to one another, which depressions are separated from one another by an intermediate elevation 39. The intermediate elevation 39 can be formed such that it exceeds the maximum height H of the projection 27 along the edge, as can be seen for a joint (Position C) in FIG. 9. Advantageously intermediate elevations 39 of this kind, and further depressions 37, are to be avoided, if for no other reason than, when controlling the laser tool, it is not possible to rule out the formation of a parallel channel path in terms of the manufacturing precision when guiding a laser in areas of overlap. As a rule, this situation also applies to the joints or intersection points (Position C), wherein due to the simplified representation, the doubling of the linear depressions and projections, which are shown in FIGS. 8 and 9, were omitted in FIGS. 5 and 6 for the sake of clarity.

Figure 9:
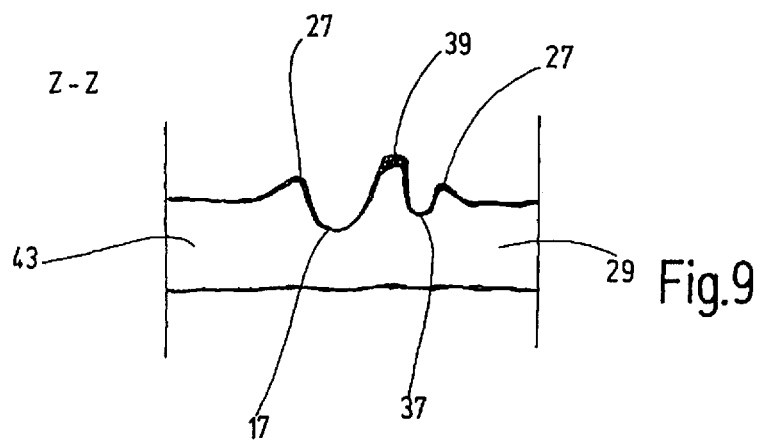
FIG. 9 is a partial end view in section of the structure in FIG. 3 at position C taken along the line Z-Z in FIG. 6.

The linear depressions 17, 37 are merged at connection points such as joints or intersection points (Position C), see also FIGS. 6 and 9, and are externally bordered by the projection 27 along the edge up to the cross-over point 41 of the respective depression 17, 37. The respective depression 17, 37 can have the greatest depth at the cross-over point 41, which cross-over point is especially clear in the representation according to FIG. 5. According to the representation in FIG. 6, in the connection regions of this kind of the respective depression 17, there may be increased melting of the plastic material. A kind of ball is then formed that can serve as a stiffening element. On the other hand, these regions may contain a corresponding depression in the cross-over point 41 in question.

Ultimately the depression is dependent on the input power of the lasers in the plastic material.

Both the structure 13 produced with the one respective wall element 11 and at least the immediately connected adjacent wall elements 43, including in the form of edge regions 25, form the container wall 29 of the ampule 1. The container wall 29 is closed off to the outside environment, extends continuously, and is formed such that it is intrinsically homogeneous and bubble-free.

Advantageously the linear depressions 17, 37 are disposed parallel to the orientation of the fibers, and thus, parallel to the extrusion direction of the plastic material in the container wall 29. In this way, the structure 13, 15 can be formed with less expenditure of energy. The respective structure 13, 15 can also be formed more reliably and true to form. The linear depressions 17, 37 are preferably produced by a $CO_2$ laser. This laser has a frequency range that can be ideally adjusted for plastics. In practice, $CO_2$ lasers in the 100 watt class, in particular, which are essentially operated at 40% laser power, have proven successful.

The method according to the invention is not only suitable for plastic products 1 made out of polyolefin, but also for other plastics, in particular plastics that appear transparent such as polyethylene (PE) or polypropylene (PP).

While one embodiment has been chosen to illustrate the invention, it will be understood by those skilled in the art that various changes and modifications can be made therein without departing from the scope of the invention as defined in the claims.

The invention claimed is:

1. A method for producing at least one structure, comprising the steps of:
   forming a plastic container product having a container wall with at least one wall element; and
   introducing a structure in the wall element as a first linear depression by action of a laser taking into account power and exposure time of the laser, plastic material of the wall element and type of structure to be formed such that the first linear depression is bordered by a projection along an edge following the first linear depression with the projection being produced under influence of inherent material tension of the plastic material.

2. A method according to claim 1 wherein
the container product is formed by a blow-molding, filling and sealing process.

3. A method according to claim 1 wherein
the structure, the wall element and adjacent wall elements form the container wall, the container wall being closed off relative to an outside environment, extending continuously and being formed intrinsically homogeneous and bubble-free.

4. A method according to claim 1 wherein
during the action of the laser, the wall element is still heated from a preceding molding process.

5. A method according to claim 1 wherein
the structure includes a second liner depression formed similarly to the first linear depression and merged at an intersection point with the first linear depression, the intersection point being externally bordered by a projection along an edge of the intersection point of the first and second linear depressions.

6. A method according to claim 1 wherein
intensity of the laser is reduced when marking speed of the laser is reduced.

7. A method according to claim 1 wherein
the wall element is irradiated by the laser a second time when intensity of the laser is reduced.

8. A method according to claim 1 wherein
a second liner depression with a projection on an edge thereof is formed in the wall element by the action of the laser and is disposed, at least in part, parallel to the first linear depression in a region of an intersection point of the first and second liner depression, the first and second linear depressions bordering a projection between the first and second linear depressions and disposed on at least one of a same level or different level from levels of the projections of the first and second linear depressions.

9. A method according to claim 1 wherein
an additional structure is introduced into the wall element opposite the first linear depression and facing an inside of the container by the action of the laser, the additional structure following the first linear depression such that a projection is introduced at a location corresponding to the first linear depression and such that a depression is introduced at a location of the projection along the edge of the first linear depression.

10. A method according to claim 1 wherein
the laser is a $CO_2$ laser.

11. A method according to claim 1 wherein
the plastic material comprises a polyolefin.

* * * * *